United States Patent
Arndt

[11] Patent Number: 5,919,292
[45] Date of Patent: Jul. 6, 1999

[54] FINGERPRINT INK

[75] Inventor: Douglas C. Arndt, Ventura, Calif.

[73] Assignee: Identicator, Inc., San Bruno, Calif.

[21] Appl. No.: 09/024,274

[22] Filed: Feb. 17, 1998

[51] Int. Cl.⁶ .................................................. C09D 11/02
[52] U.S. Cl. .................................. 106/31.03; 106/31.65; 106/31.66; 106/31.67; 106/31.9; 106/477
[58] Field of Search .............................. 106/31.65, 31.66, 106/31.67, 31.9, 477, 31.03

[56] References Cited

U.S. PATENT DOCUMENTS

| | | | |
|---|---|---|---|
| 1,497,972 | 6/1924 | Bock | 106/31.03 |
| 1,951,203 | 3/1934 | Pitman | 427/1 |
| 2,235,632 | 3/1941 | Heinecke | 106/31.03 |
| 4,182,261 | 1/1980 | Smith, III et al. | 106/31.03 |
| 4,226,740 | 10/1980 | Worsham et al. | 106/31.03 |
| 4,260,645 | 4/1981 | Kerr et al. | 106/31.03 |
| 4,262,623 | 4/1981 | Smith, III et al. | 427/1 |
| 4,379,178 | 4/1983 | Meadows et al. | 427/1 |
| 4,504,408 | 3/1985 | Morton | 106/31.03 |
| 4,879,134 | 11/1989 | Vassiliades | 106/31.03 |
| 5,395,444 | 3/1995 | Arndt et al. | 118/31.5 |

FOREIGN PATENT DOCUMENTS

| | | | |
|---|---|---|---|
| 700272 | 12/1964 | Canada | 106/31.03 |

*Primary Examiner*—Helene Klemanski
*Attorney, Agent, or Firm*—Harold L. Jackson

[57] ABSTRACT

A fingerprint ink is formulated from a solvent carrier and a low structure carbon dispersion. Carbon particles with an agglomerate size of less than 100 millimicrons are dispersed in a hydrocarbon soluble oleo resin to form the low structure carbon dispersion, with the carbon particles accounting for about 40% to 60% of the total dispersion and the dispersion accounting for 20% or less of the total ink formulation.

21 Claims, No Drawings

FINGERPRINT INK

BACKGROUND OF THE INVENTION

1. Field of the Invention

The present invention relates to ink to be applied to a person's fingertip's etc. and subsequently transferred to a recording medium to provide a pattern corresponding to the person's fingerprints, palm prints, etc.

2. Description of the Prior Art

Fingerprints have been widely used for many years to positively identify people. For many years fingerprints were obtained by dispensing a viscous carbon black pigmented ink, i.e, in a gel or paste form, from a tube onto a plate or other flat surface and rolling the fingertips of the person to be fingerprinted over the plate. The fingertips were then rolled or pressed onto a suitable recording surface, made of paper, for example. This system is referred to hereinafter as "tube/roller system".

Many of the tube inks used in the tube/roller system suffer the disadvantages of: excessively staining the skin; requiring solvent or special cleaners for cleaning of tools and of the skin; separating into layers of clear oil and black paste while in the tube; drying rapidly so as to require immediate clean-up, as opposed to being reused at a later time if left on the plate and roller; having a slippery consistency, which makes coating the fingers somewhat difficult and may result in smudged images on the recording medium. There is a need for better viscous carbon pigmented ink for use in connection with the tube/roller system which overcomes the above disadvantages.

While the conventional tube/roller system is suitable for use in police stations and the like, it is not well suited for use by banking and retail establishments because of the expertise required in providing the proper thickness of ink on the plate, space requirements and required clean-up.

Various other methods have been developed to enable such establishments to record fingerprints on a document, most of which involve either black ink or inkless chemical processes. Fingerprints, as they apply to check and credit card transactions, are used as a deterrent to fraud and to assist in the prosecution process. One of the problems with "bad check" cases is the lack of solid evidence to obtain an arrest, prosecution, and conviction. However, a fingerprint placed on the fraudulent document solves this problem. Many case studies prove that check fraud losses can be reduced by a minimum of fifty percent. In the prosecution of check fraud criminals, fingerprints historically identify suspects over ninety-two percent of the time.

The environment surrounding check and credit card transactions requires the fingerprinting ink to be nonstaining on the skin so that customers are not offended and so that clean-up is unnecessary. The ink needs to be formulated so that it may be packaged in a pad that is easy to use and in a material that will provide high, fingerprint resolution. It is desirable for the ink to possess sufficient opacity and neutrality of color for reproduction on microfiche, as checks are commonly disposed of after they have been recorded on film.

Nonpigmented inks which do not leave a visible residue on the fingertips have been available for sometime. However, these nonpigmented inks generally require the use of two separate chemical compounds. One of the compounds is applied to the fingerprint area and the other compound is impregnated into the recording surface before the fingerprinting procedure or otherwise transferred to such surface after the fingerprinting procedure to form a visible reaction product delineating the ridge pattern to form a visible fingerprint.

Pigmented inks which utilize a carbon pigment to form the visible print generally stain the fingers. Such inks conventionally comprise a carbon black dispersion in which the carbon pigment (comprising about 50% or less of the dispersion) is dispersed in paraffinic mineral oil. This dispersion must be processed, for example, by ball milling the mixture for several hours, to break up existing agglomerates before the dispersion can be diluted with a suitable solvent or carrier. One carbon pigmented ink and a microporous dispensing pad therefore which deposits a small amount of ink on the fingertips to thereby substantially eliminate staining is described in U.S. Pat. No. 5,395,444 ("'444 patent") assigned to Identicator Corporation ("Identicator"), the assignee of this application. The ink described in the '444 patent employs a carbon black pigment dispersion concentration of about 22% by weight (within the range of 15% to 30%) with the carbon black particles having an average particle size of about 0.35 microns and the particle size falling within the range of 0.15 to 0.60 microns. The '444 ink, as commercially marketed by Identicator, requires, in addition to the carbon black dispersion and a napthenic oil carrier, the addition of a polymer such as an alkylated polyvinylpyrrolidone to minimize the degree to which the graphics, such as a fingerprint, can become blurred, lose contrast and resolution. The addition of a polymer usually requires extra time for the application of heat and agitation. The carbon pigment itself, due to its light scattering properties attendant to particle size, tends to create graphics which appear brownish in color. The desired color for a fingerprint is an achromatic black. Modifying the ink so that it becomes a gel or a paste for use in the conventional tube/plate roller method, requires additional polymer which typically adds both material and processing costs. Also, the commercial '444 ink contains a red pigment in the range of 5% to 10% by weight which functions as an optical enhancer to make the print more compatible with electronic scanning equipment. In addition, the surface at the ceramic dispensing pad for the '444 commercial ink has required surface treatment with silane, for example, to reduce the interfacial surface tension of the pad. This treatment ensured that a sufficient supply of ink was available on the pad surface. However, such treatment further added to the manufacturing costs of the pad.

It has been discovered that a carbon pigmented ink in which the agglomerate size of the carbon particles is made considerably smaller than the particle size of the carbon used in the prior art inks not only overcomes many of the disadvantages described above with respect to viscous tube/roller inks and nonstaining pad inks, but provides superior print contrast (i.e., between the ridges and valleys) and is considerably less expensive than the prior art inks.

SUMMARY OF THE INVENTION

In accordance with the present invention a low structure carbon dispersion, in which the carbon particles are dispersed in an oleo resin is combined with a carrier selected from the group consisting of nonvolatile oils, nonvolatile oil complexes, fatty alcohols and fatty acid esters. The carbon particles account for about 40% to 60% of the dispersion with the agglomerate size of the carbon particles being less than about 100 millimicrons. Preferably, the oleo resin is a blend of aliphatic hydrocarbon soluble resins such as one or more of the phenolic, maleic, hydrocarbon and alkyd resins.

DESCRIPTION OF THE PREFERRED EMBODIMENT

In accordance with the present invention, carbon particles having an extremely small agglomerate size are dispersed in a hydrocarbon soluble oleo resin, to form a low-structure carbon dispersion. The dispersion is then combined with a carrier selected from one or more of the nonvolatile oils, nonvolatile oil complexes, fatty alcohols and fatty acid esters to form the fingerprint ink.

The carbon particles account for about 40% to 60% and preferably about 50% of the total dispersion with the agglomerate size of the carbon particles being less 100 millimicrons and preferably falling within the range from 20–50 millimicrons and most preferably about 30 millimicrons. One such low structure carbon dispersion is distributed by Continental Dispersion Incorporated of Chicago, Ill. under the product number HW-5400. The very small agglomerates of carbon pigment are believed to result from an agglomeration of only a few particles of carbon. The agglomerate size of the carbon particles of the low carbon structure dispersion is many times smaller than the average single particle size of the carbon pigment in the ink disclosed in the '444 patent (and as previously used by the assignee in it's commercial fingerprint ink) is about 350 millimicrons.

The small particle size of the carbon pigment in the low structure carbon dispersion, provides an increased surface area as contrasted with the prior art carbon based inks. The increased surface area provides better coverage on the recording surface, e.g., paper. Such increased coverage results in fewer areas of uncovered recording surface (e.g. bare paper) showing through the carbon particles defining the fingerprint ridge lines. The blend of aliplatic, hydrocarbon soluble oleo resins makes possible the high, 50%, concentration of the low structure carbon pigments. The blend of oleo resins preferably includes phenolic, maleic, hydrocarbon and alkyd resins. An additional wetting agent, such as alpha methyl glucoside, may be and preferable is added to the blend. The alkyd constituent (which may, for example, comprise a drying oil such as linseed oil) copolymerized with a fatty acid also acts as a wetting agent in maintaining the dispersion in a steric stabilized and deflocculated state. The resin blend also imparts both cohesion and adhesion to the fingerprint ink. Such properties minimize "bleeding" of the fingerprint ridges in and migration of pigment throughout the recording medium, such as paper, resulting in high resolution and good contrast even when the pigment concentration in the ink is less than 1% by weight as compared to about 11% or more in ink of the '444 patent. It should also be noted, that appreciably lowering the pigment concentration of the prior art ink disclosed in the '444 patent would have a tendency to de-stabilize the carbon suspension when stored in bulk and particularly as it travels through a porous pad (if such an ink dispensing vehicle is employed) to the finger.

The carrier may comprise one or more of nonvolatile oils (i.e., oils which do not evaporate rapidly), nonvolatile oil complexes, fatty alcohols and fatty acid esters.

The non-volatile oils and oil complexes include oils derived from petroleum (aliphatic), plants (vegetable) and animals. For example, the following oils have proven suitable as a carrier for the low structure carbon dispersion:

mink oil, conventional 10–30 motor oil, corn oil, vaseline petroleum jelly, corn oil margarine, WD-40, mineral oil, silicone oil, cod liver oil, olive oil, almond oil, glyceryl monooleate, oleic acid, and diethanolamides (DEA's), namely coco diethanolamide and soya diethanolamide.

The fatty alcohols include behenyl, iso-stearyl, iso-cetyl, arachidyl, stearyl, cetyl, oleyl, myristyl, lauryl, decyl and octyl. The fatty acid esters include the reaction products of one or more of the alcohols and one or more of the fatty acids identified in the table below:

| ALCOHOL TYPE | FATTY ACID |
|---|---|
| PRIMARY-methyl | myristic |
| -ethyl | oleic |
| -propyl | lauric |
| -butyl | stearic |
| -isopropyl | palmitic |
| DIOLS-glycols | |
| TRIOL-glycerol | |

Some of the above combinations will yield a waxy solid which can be economically used to increase the viscosity of the ink. One such example is glycol searate.

The preferred hydrocarbon solvent is a heavy naphthenic mineral oil, such as the hydrotreated distillate N-750, 1,200, 2,400 etc. INKOL from Maggie Brothers. The numeral following the N, e.g. 750, relates to the viscosity, the higher the number the greater the viscosity. Excellent results are also obtainable using heavy, solvent refined naphthenic mineral oils.

Mineral oils, such as N-750 INKOL, may lack the viscosity required to maintain capillarity of pigment in a porous structure. As disclosed in the prior art, an alkylated polyvinylpyrrolidone (PVP) may be used to increase viscosity. The preferred PVP is a 2-pyrrolidone 1-ethenylhexadecyl homopolymer, such as ISP Technologies' Ganex V216. This material also functions as a dispersant for the carbon pigment. Alternatives to the Ganex v216 are alkanolamides such as cocamide DEA, soyamide DEA, Lauramide DEA (preferred), and cocamide MEA compounds manufactured by Chemron Corporation.

The low structure carbon dispersion comprises about 20% or less and preferably within the range of 0.3 to 15% by weight of the total ink product. For relatively viscous inks suitable for dispersion by the conventional tube/roller system or by a relatively porous pad, the low structure carbon dispersion preferably comprises less than about 20% and preferably 10% or less of the total ink. For inks suitable to be dispersed via a pad, made for example of ceramic, the low structure carbon dispersion may comprises about 0.3% to 2% by weight of the total ink product.

Stainless inks which leave comparatively little visible residue on a person's fingers as compared to conventional carbon black inks are preferred for reasons pointed out previously, i.e., soiling of the fingers and clean up. The amount of stain left on a person's fingers by a carbon based ink is a matter of degree, depending on the pigment concentration and on the adhesive characteristics of the carrier. Law enforcement agencies prefer an ink with a higher concentration while entities involved in deterring check fraud prefer a lower pigment concentration.

A preferred embodiment of the invention for a nonstaining ink suitable for fraud deterrent use with a dispensing pad, such as the one disclosed in the '444 patent, has both a pigment concentration and a resin concentration of about 1.25% by weight, i.e., each constituent comprises 1.25% of the total ink composition by weight. The ink is formulated as follows:

30 parts by weight N-750 INKOL (Maggie Brothers Oil Co., Franklin Park, Ill.), 10 parts Ganex V216 or lauramide DEA, and 1 part HW-5400.

It is to be noted that surface treatment of the ceramic pad with, for example, silane, has not been necessary when the pad is used to dispense the ink of this invention. Also, when the ink is used with other porous dispensing pad materials, such as high density polyethylene, the pigment/resin concentrations may be reduced to only 0.625%. Such an ink may be formulated as follows:

60 parts by weight N-750 INKOL, 20 parts Ganex V216 or lauramide DEA, and 1 part HW-5400.

An intermediate formulation is 45 parts by weight N-750 INKO, 15 parts Ganex V216 or lauramide DEA, and 1 part HW-5400.

A higher pigment concentration acceptable by law enforcement agencies may be formulated with a carbon pigment concentration of about 5% by weight, i.e, the low structure carbon dispersion comprises about 10% by weight of the total ink product. An example of one such ink formulation is as follows:

one part HW-5400 50% carbon dispersion two parts isopropyl myristate eight parts anhydrous lanolin Such ink may be dispensed via a ceramic or plastic pad. The print contrast signal of this 10:1 formulation, i.e., one part, by weight of the low structure carbon dispersion ten parts, by weight of carrier, was measured with a PCMII color densitometer manufactured by Gretag Macbeth of New Windsor, N.Y., and compared with the print contrast signal of the '444 ink using filters covering the visible color spectrum and the near infrared band. The 10:1 formulation using low structure carbon dispersion provided a 15% to 20% improvement in the print contrast signal.

A law enforcement ink, with a somewhat lower pigment concentration suitable for use in a porous polyethylene pad, may be formulated as follows: 90 parts by weight N-750 Inkol, 30 parts Ganex V-216 or lauramide DEA, and 6.94 parts HW-5400 dispersion. While the pore volume of the polyethylene pad was only about ½ that of ceramic, the plastic transfers roughly the same amount of ink to the fingers because it has a greater affinity for oil than does ceramic.

An additional advantage of low structure carbon dispersion formulated fingerprint is cost. The use of the low structure carbon dispersion reduces the manufacturing costs of the ink as compared with the '444 commercial ink by almost an order of magnitude.

There has thus been described a novel fingerprint ink which is relatively inexpensive and provides superior quality prints. Various modifications of and/or additions to the disclosed ink will become obvious to those skilled in the art without involving any departure from the spirit and scope of the present invention as defined by the appended claims.

What is claimed is:

1. A fingerprint ink comprising:
   a low structure carbon dispersion in which carbon particles are dispersed in an oleo resin with the agglomerate size of the carbon particles being less than about 100 millimicrons, the carbon particles accounting for about 40% to 60% of the total dispersion and a carrier selected from the group consisting of nonvolatile oils, nonvolatile oil complexes, fatty alcohols and fatty acid esters, the low structure carbon dispersion comprising about 20% or less, by weight, of the ink.

2. The invention of claim 1 wherein the oleo resin comprises a blend of aliphatic hydrocarbon soluble resins.

3. The invention of claim 2 wherein the resins comprise alkyd resins.

4. The invention of claim 3 wherein the carrier comprises an oil selected from the group consisting of napthenic and paraffinic mineral oils.

5. The invention of claim 2 wherein the agglomerate size of the carbon particles is less than 50 millimicrons.

6. The invention of claim 5 wherein the agglomerate size of the carbon particles is about 30 millimicrons.

7. The invention of claim 6 wherein the low structure carbon dispersion comprises about 10% or less, by weight, of the ink.

8. The invention of claim 6 wherein the low structure carbon dispersion comprises less than 5%, by weight, of the ink.

9. The invention of claim 8 wherein the low structure carbon dispersion comprises less than 2%, by weight, of the ink.

10. The invention of claim 9 wherein the percentage of ink, by weight, of low structure carbon dispersion falls within the range of 0.3% to 2%.

11. A fingerprint ink comprising:
    a low structure carbon dispersion in which carbon particles are dispersed in a hydrocarbon soluble oleo resin with the agglomerate size of the carbon particles being less than 50 millimicrons, the carbon particles accounting for about 40% to 60% of the total dispersion and a solvent carrier, the low structure carbon dispersion comprising about 20% or less, by weight, of the ink.

12. The invention of claim 11 wherein the oleo resin comprises a blend of aliphatic hydrocarbon soluble resins.

13. The invention of claim 12 wherein the resins comprise alkyd resins.

14. The invention of claim 11 wherein the carrier consists of one or more materials selected from the group of non-volatile oils, nonvolatile oil complexes, fatty alcohols and fatty acid esters.

15. The invention of claim 14 wherein the carrier is selected from the group of nonvolatile oils and nonvolatile oil complexes.

16. The invention of claim 15 wherein the carrier comprises an oil selected from the group consisting of napthenic and paraffinic mineral oils.

17. The invention of claim 16 wherein the low structure carbon dispersion comprises about 10% or less, by weight, of the ink.

18. The invention of claim 17 wherein the low structure carbon dispersion comprises less than 5%, by weight, of the ink.

19. The invention of claim 18 wherein the low structure carbon dispersion comprises less than 2%, by weight, of the ink.

20. The invention of claim 19 wherein the percentage of ink, by weight, of low structure carbon dispersion falls within the range of 0.3% to 2%.

21. The invention of claim 11 wherein the agglomerate size of the carbon particles falls within the range of about 20–50 millimicrons.

* * * * *